United States Patent [19]

Andersen et al.

[11] Patent Number: 5,232,649
[45] Date of Patent: Aug. 3, 1993

[54] METHOD OF REMOVING LIQUIDS FROM SOLIDS

[75] Inventors: Paul G. Andersen, Warwick, N.Y.; Kai L. Kite-Powell, Mahwah, N.J.

[73] Assignee: Werner & Pfleiderer, Ramsey, N.J.

[21] Appl. No.: 878,930

[22] Filed: May 6, 1992

Related U.S. Application Data

[62] Division of Ser. No. 606,561, Oct. 31, 1990, Pat. No. 5,151,026.

[51] Int. Cl.⁵ .......................... B29C 47/62; B29B 7/84
[52] U.S. Cl. .......................... 264/211.23; 264/102; 264/140; 264/349; 264/DIG. 69; 366/77; 425/DIG. 46; 159/2.1
[58] Field of Search .............. 264/211.23, 349, 101, 264/570, 344, 102, 140, 233, DIG. 69; 425/203, 204, 208, 205, DIG. 46, 382.3, 382.4, ; 366/77, 88, 75, 81; 159/2.1, 2.2; 241/21; 100/935

[56] References Cited

U.S. PATENT DOCUMENTS

| | | | |
|---|---|---|---|
| 2,985,909 | 5/1961 | Smith | 264/DIG. 78 |
| 3,035,306 | 5/1962 | Rossiter | 425/208 |
| 3,070,836 | 1/1963 | DeHaven et al. | 425/204 |
| 3,742,093 | 6/1973 | Skidmore | 264/349 |
| 3,993,292 | 11/1976 | Skidmore | 264/349 |
| 4,148,991 | 4/1979 | Skidmore | 264/349 |
| 4,446,094 | 5/1984 | Rossiter | 264/349 |
| 4,659,300 | 4/1987 | Schwarz | 264/349 |
| 4,776,269 | 10/1988 | Coggins et al. | 241/21 |
| 4,943,402 | 7/1990 | Kafka et al. | 264/211.23 |

Primary Examiner—Jeffery Thurlow
Assistant Examiner—Mathieu Vargot
Attorney, Agent, or Firm—John G. Gilfillan, III

[57] ABSTRACT

To extract a liquid from a workable mass of material a first force is applied to the material in a first direction. A second opposed force is applied to the material within or slightly downstream of a liquid-extraction location. These opposed forces tend to compact the material to extract the liquid. The extracted liquid moves out of the liquid-extraction location along a path which extends generally transverse to the direction of the first and second forces. Third forces are applied to the material along the path in a direction generally opposite to that taken by the exiting liquid to prevent the material from traversing the path but to permit the liquid to exit. The first, second and third forces form a pinch point on the material within or slightly downstream of the liquid-extraction location to substantially obviate liquid flow countercurrent to the direction of the first force.

14 Claims, 3 Drawing Sheets

METHOD OF REMOVING LIQUIDS FROM SOLIDS

This is a division of co-pending application, Ser. No. 606,561, filed Oct. 31, 1990, now U.S. Pat. No. 5,151,026.

BACKGROUND OF THE INVENTION

The presen invention relates to a method of and apparatus for removing liquids from solids or non-liquids. More specifically, the present invention relates to a method and apparatus for dewatering expanded or flocked materials or any other solid, in particulate or other form, having a large surface area which holds substantial quantities of water thereon or therein. The present invention may be used to remove water from natural and synthetic polymers or elastomers such as flocked latexes, crumb rubber, other rubber materials, and plastic materials, particularly polystyrene foam and similar materials. The invention may also be used to dewater fibrous or pulpy material such as wood or cane.

Many manufacturing and use activities involving polymers result in large amounts of water-containing material from which the water must be removed. For example, in making rubber a solution or slurry of rubber in a solvent may be produced. Steam and water are percolated through the slurry to vaporize the solvent, leaving behind a rubber particulate having a high water content. This water must be removed before the rubber can be conveniently processed into articles or products.

Another area of concern relates to those materials which result from fast food and other restaurant operations in which food and drink are served in and on a variety of plastic media, such as plates, cups and compartmentalized carriers. These materials become waste after the comestibles formerly borne thereby has been consumed.

The disposition of this plastic waste raises at least two concerns. First, the plastic waste is typically not rapidly biodegradable. Thus, disposal thereof by conventional procedures, such as those utilizing land fills, may be objectionable to some. Burning the waste may be potentially objectionable if the combustion products are noxious or are health threatening. Second, the costs of producing the materials, and the materials themselves, would be irrevocably lost if the materials were simply disposed of. Many plastic materials can be re-used to manufacture subsequent plastic products if a cost-effective way is found for placing them in a condition suitable for such re-use.

The use of polystyrene materials as dishes results in their being contaminated with food and drink. To re-use the materials, they are subjected to particulation or comminultion and to washing or rinsing with water in an effort to remove the food and drink contamination therefrom. Such washing or rinsing adds substantial quantities of water to the particulate materials.

It is well known that plastic materials such as polystyrene foam can be reused and that such re-use is best achieved with the materials comminuted and "dry", that is, in a particulate, granular or flake form with much of the water removed therefrom. The comminuted plastic is typically transported and worked in a continuous screw press or barrel-screw apparatus, such as an extruder, at the output of which the material is extruded. The extrudate is cut to produce pellets of the material. These pellets are re-used to produce foamed polystyrene products.

If the comminuted plastic is not dry, the working thereof by an extruder is inefficient owing to the fact that the majority of the heat generated by working the plastic is initially absorbed by the water. This renders the working process inefficient. It also requires that vents or pressure relief facilities be present on the extruder so that substantial quantities of steam resulting from heating the water do not cause substantial steam evolution and/or violent escape thereof which can render extrusion inefficient or ineffective. In any event, it is required that steps be taken or facilities be provided to safely handle large quantities of steam. If an extruder could be designed to accommodate the presence of substantial quantities of water in the comminuted material, the transport and working thereof would proceed quite slowly, since heating and driving off water—having a high specific heat—requires time and energy. Water removal achieved by heat input is expensive and slow.

The prior art contains various apparatus for dewatering elastomers or polymers. U.S. Pat. No. 3,672,641 discloses apparatus for removing liquids from polymers which includes an extruder. The barrel of the extruder includes plural screen bars which define therebetween drain openings communicating with the barrel bore. Expansion chambers—increased diametric sections of the barrel bore—are preceded by restricted passages defined by collars on the extruder screw and a closely spaced choke on the bore wall. Liquid is said to be pressed from material worked by the extruder, the liquid exiting the barrel via the drain openings. A high degree of working is also said to "superheat" the water in the worked material so that the water in the material-water combination vaporizes and is "flashed off" in the lower pressure expansion chambers via the drain openings. Experience has shown that the material tends to clog or block the drain openings, necessitating continuous cleaning thereof. Further, the steam which is intentionally produced must be safely handled and conducted away. The apparatus of U.S. Pat. No. 3,587,450 is similar to that of the '641 patent.

In U.S. Pat. No. 3,035,306 a continuous screw press includes a longitudinally grooved barrel and a screw, the flight of which is spaced from the screw stem. Water-containing material is worked by the press expressing water therefrom which is said to reversely flow through the grooves and the flight-stem spaces. This reverse flow is counter to the direction of material movement and causes the water to move to a point up stream of material feed, whereat it drains from the barrel. The material tends to clog the drain as well as the grooves and the flight-stem spaces. Such clogging and the movement of the material tend to cause expressed water to be trapped downstream of the feed to the detriment of the efficiency of the process and the quality of the material. The dewatering portion of the aparatus in U.S. Pat. Nos. 4,490,104; 4,493,630; 2,994,105; 3,768,171; and 3,595,162 are similar in function to that of the '306 patent.

In view of the foregoing, the present invention contemplates a method and apparatus for dewatering materials, including waste plastics, which avoid the problems summarized above and permit the cost-effective processing and use of such materials.

SUMMARY OF THE DISCLOSURE

In its broadest aspects, the present invention contemplates a method of and apparatus for removing or extracting liquid from non-liquid material. The material is one which is capable of being processed by a continuous screw press or other extrusion-type apparatus which includes one or more barrels and screws, that is, a material capable of being transported and/or worked by a barrel-screw combination. Such materials include natural and synthetic polymers and elastomers—such as flocked latexes, crumb rubbers, other rubbers—plastics, such as polystyrene foam, expended or flocked materials, and other particulate or comminuted substances such as wood or cone pulp. Any of these or other materials which have high surface area and, as a consequence, retain by absorption, adsorption or otherwise significant amounts of a liquid are potentially useful in the present invention. In specific embodiments the liquid is water and the material is particulate or comminuted polystyrene foam or polystyrene foam crumb.

As used herein "extruder" means any extruder-type apparatus, including a continuous screw press or other combination of a barrel and a screw or worm. An extruder may have one or more axially aligned screw sections commonly rotated as a single screw but having varying flight pitches and "handedness" (i.e., some flights may be right-handed and others left-handed). An extruder may also include side-by-side screws which may be co-rotating and intermeshing or counter-rotating and either intermeshing or non-intermeshing. An extruder also includes a barrel, which cooperates with the screw(s) to feed and work material. The barrel may be made up of axially aligned barrel sections surrounding and cooperating with the screw(s). The term "barrel-screw" denotes an extruder or other continuous screw press as described heretofore.

In practicing the method, the liquid-containing material is first transported or fed to an extraction location. Preferably, this function is performed by a first extruder, and the extraction location is within its barrel. Transporting or feeding of the material is effected by the first extruder applying first feeding and working forces thereto. These first forces or their resultants are applied to the material generally in a first direction. Second working forces are applied to the material in the vicinity of the extraction location. The second forces or their resultants are applied to the material generally in a second direction which is generally opposite to the first direction. The application of the first forces and the simultaneous application of the first and second oppositely directed forces compact the material to extract or express therefrom the liquid.

The extracted liquid is permitted to exit the barrel of the first extruder at or in the vicinity of the extraction location along a path which is generally transverse to the direction of the first and second forces. Simultaneously with the exiting of the liquid, the material is prevented from traversing the exit path by applying along the path third forces which are generally opposite in direction to that taken by the exiting liquid. The third forces are ineffective to prevent the exiting of the liquid. The third forces are ineffective in this regard because they are drag flow forces. Drag flow forces are capable of preventing the material from traversing the exit path, but are incapable of preventing the liquid from traversing the exit path.

In preferred embodiments, the third forces are produced by a second extruder. The barrels of the first and second extruders are in communication and the terminus of the second extruder screw is closely spaced from the envelope of the first extruder screw. The close spacing is, in specific embodiments, about one to three millimeters.

In further embodiments the material is cleaned and comminuted before being introduced into the first barrel-screw, and the removed liquid comprises the water used in such cleaning. The material may be a scrap plastic, such as polystyrene foam, and 70% or more of the liquid is removed. Preferably, both the liquid exit path and the direction of the third forces are horizontal. At the extraction location and upstream thereof the material is and remains substantially unmelted. This permits the material to be further processed downstream of the liquid extraction location and pellitized for subsequent remanufacture.

The third forces may be applied substantially at or slightly upstream of the extraction location. In either event the general confluence of the first, second and third forces defines a pinch point. The second forces may be produced by a section of the first screw which is opposite-handed relative to sections of the first screw upstream thereof.

Water may be removed in stages at a number of extraction locations to which the material is serially moved.

The apparatus of the present invention comprises that set forth above and equivalents which are effective in carrying out the above-summarized method.

DETAILED DESCRIPTION

Plastic materials, including plastic waste such as polystyrene foam resulting from discarding fast food containers, after contact with water, such as occurs during washing to remove food and drink residue, may include up to 50% by weight of water. Recycling of essentially water-free plastic materials, such as polystyrene, could include initial heating in an oven to drive off the water. Following this the polystyrene is melted and worked by one or more extruers into new product or pellets. The pellets would be sold in bulk to manufacturers of polystyrene articles for reuse.

Driving off water with heat is expensive and time-consuming, since water has a very high specific heat. Applying high heat to water-containing polystyrene in an oven may melt the polystyrene, rendering it difficult or unusable for further processing. If undesirable melting of the polystyrene is avoided by driving off the water and the volatile components with mild heat, water removal times will be quite long.

The present invention permits water removal to be achieved in reasonable times with the expenditure of little or no expensive heat energy input.

Figure 1:
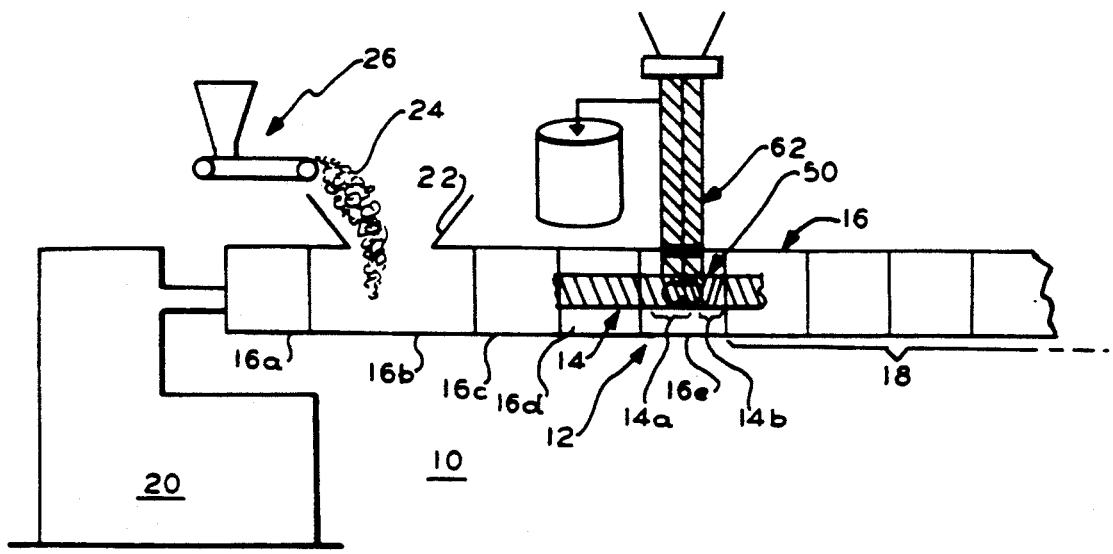
FIG. 1 is a schematic, side elevational rendering of novel apparatus according to the present invention for carrying out the novel method thereof.
Figure 2:
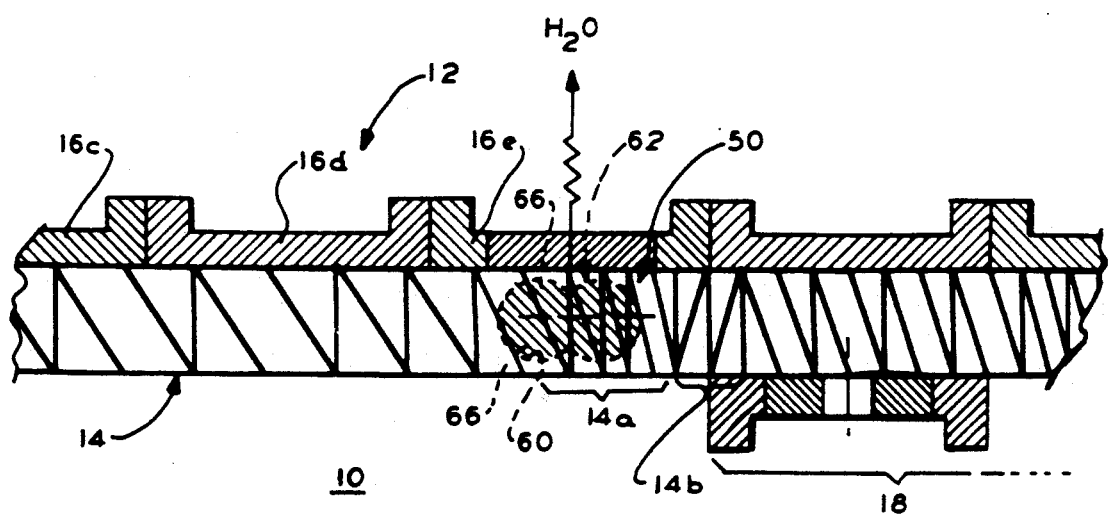
FIG. 2 is a magnified side elevational view of a portion of the apparatus schematically shown in FIG. 1.
Figure 3:
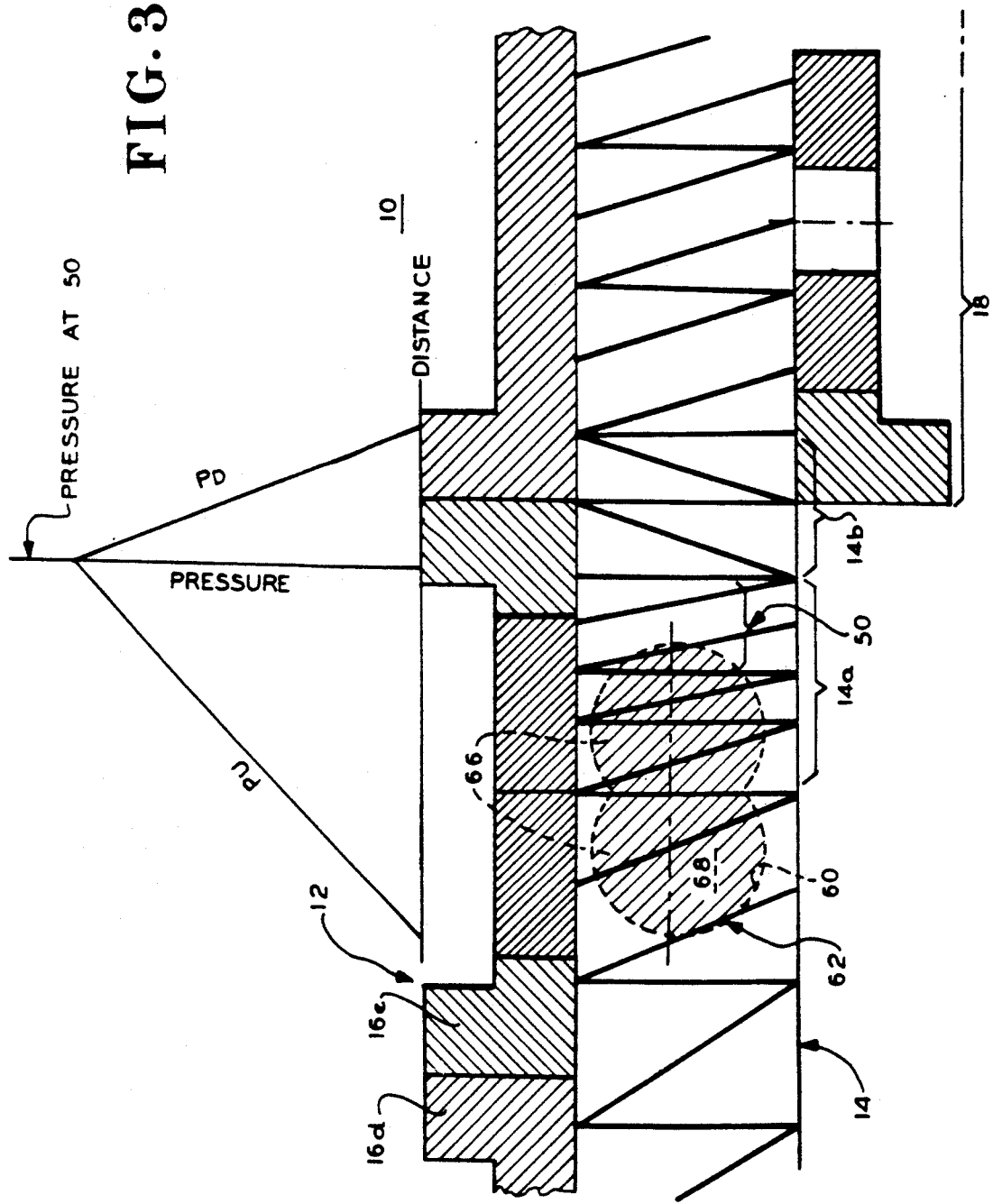
FIG. 3 is a pressure profile diagram representing the working forces applied to materials by the apparatus of FIG. 2.

Referring to the schematic depictions of FIGS. 1-3, apparatus 10 for practicing the present invention comprises an extruder or barrel-screw combination 12. The extruder 12 may take a wide variety of configurations, and may be a single-screw or twin-screw extruder or compounder. A screw portion 14 of the barrel-screw 12 may be right-handed or left-handed. Where the screw portion 14 is a twin screw, the individual screws thereof may be co-rotating and intermeshing or may take other forms. Further, the screw portion 14 may comprise screw segments, right-handed and/or left-handed, mounted or keyed to a common rotating member (not shown), as is well known. One preferred extruder 12 is an appropriate model of ZSK (Zweiwellew Schnecken Kneter) co-rotating, intermeshing, twin-screw extruder manufactured and sold by the assignee of the present invention.

The extruder 12 also includes a barrel portion 16 within a bore or bores of which the screw portion 14 rotates, as is well known. The barrel portion 16 may comprise a plurality of barrel sections, such as 16a-16e, having internal bores with which the screw segments of the screw portion 14 cooperate to transport and work material so as to effect water removal, as described below. The screw portion 14 may extend beyond barrel section 16e and into additional down-stream barrel sections, constituting a down-stream barrel portion 18, which in cooperation with the screw portion 14 therein processes the now dewatered material into new product or pellets in any well known manner.

The barrel section 16a houses a section (not shown) of the screw portion 14 which is connected to a motive power source 20 capable of selectively rotating the screw portion 14. The barrel section 16b contains a feed opening 22 for receiving material 24 to be dewatered. Feeding may be achieved by a belt feeder or the like, as schematically shown at 26.

The material 24 may comprise any substance which is capable of being transported and worked by the barrel-screw 12. In specific embodiments, this material may comprise comminuted polystyrene foam or foam crumb in flake or particulate form, and constitutes polystyrene particles of about 1.0 square centimeters having a bulk density of about 7 pounds per cubic foot and including from about 15% to about 45%-50% by weight of water. The included water comes primarily from the water used to wash and rinse the polystyrene to remove food and drink residue. Washing, rinsing and comminuting are not depicted and may be carried out in any convenient manner prior to the feed opening 22 receiving the material 24.

As noted above, the water present may come from other processing steps. For example, water may be present as a result of vaporizing solvents from rubber solutions by passing steam and water through the solution. Water may also be present as a result of producing slurries of paper, cane or wood pulp or from previous processing of any extruder-workable material which has a high surface area.

The segment (not shown) of the screw portion 14 within the barrel sections 16b and 16c contains a thread worm or ribbon having a crest and a base which is effective to transport the material 24 rightwardly in FIG. 1. This transporting continues in the barrel section 16d. The cooperation between the sections of the screw portion 14 and the barrel sections 16b-16d of the barrel portion 16 is such that so-called starved feeding of the material 24 is utilized at the feed opening 22. Further, during the transport process, the material is and remains substantially unmelted. This may be achieved by the starved feeding of the material 24, as well as by not adding heat (or cooling, if necessary) the barrel sections 16b-16d. Any known technique may be utilized to prevent substantial melting of the material 24, including adjusting the degree of cooperation and the resultant shear between the screw portion 14 and the barrel portion 16 in any known manner.

The material 24 is transported by the barrel-screw 12 to a barrel section 16e which contains an extraction location 50 whereat water contained therein is extracted.

As is well known, the transport of the material 24 by the action of the barrel-screw 12 is primarily due to drag forces, that is, to the action of the thread of the screw portion 14 on 14 and the barrel portion 16 on the material 24. These drag forces are effective to transport the material 24 due to its high viscosity. The transport of low viscosity materials by a non-positive displacement device such as the barrel-screw 12 is inefficient at best if it occurs at all. By the time the material 24 reaches the barrel section 16d and its included extraction location 50, the barrel-screw 12 has begun to work, convey and compact the material 24, which, as already noted preferably remains substantially unmelted through its arrival to the extraction location 50. Such working which applies forces to the material 24 is achieved by appropriate selection of the segments of the screw portion 14 and the sections of the barrel portion 16.

Figure 4A:
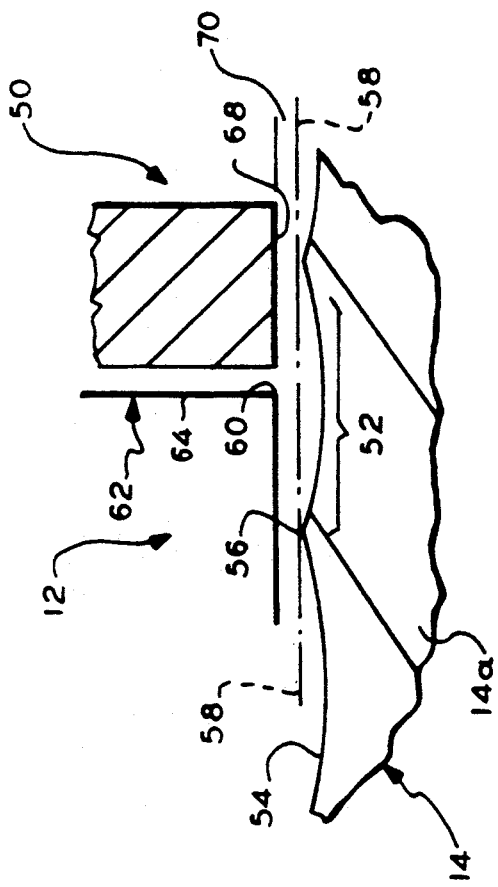
FIGS. 4 and 4a are partial schematic views of the portion of the apparatus depicted in FIG. 2 as seen from the top.
Figure 4:
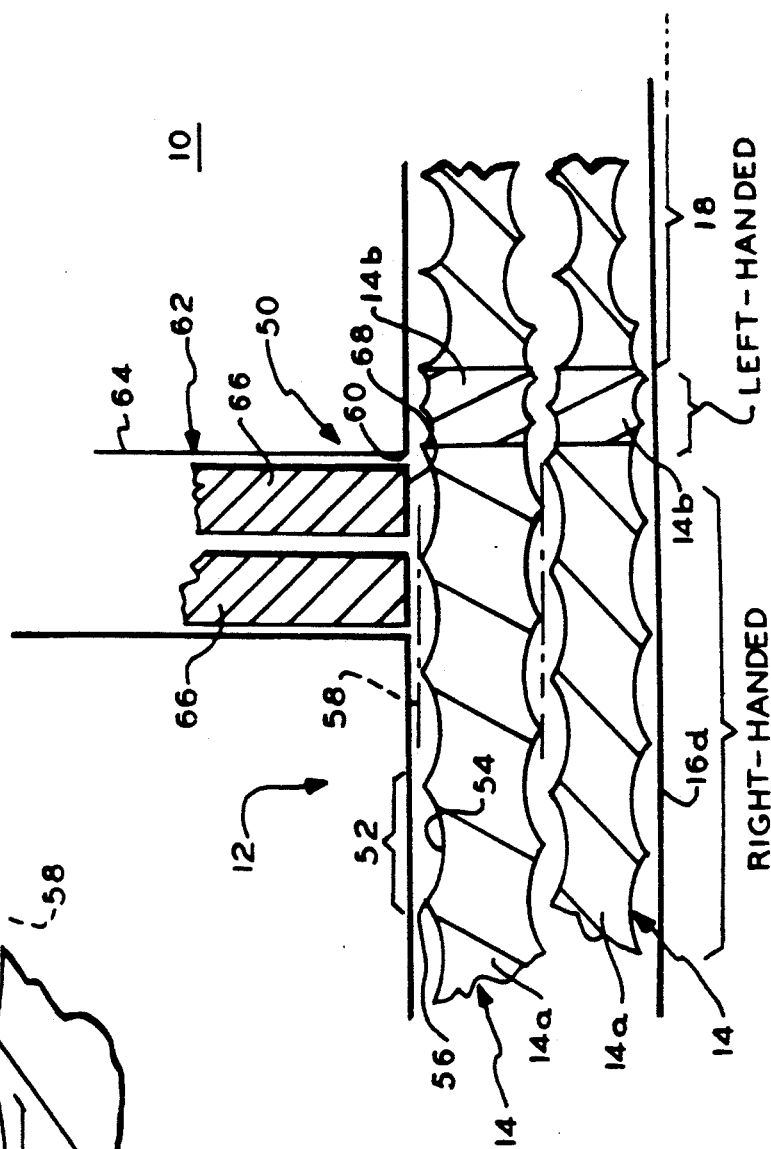

Referring now to FIGS. 4 and 4a, the barrel-screw 12 is shown to include twin, co-rotating, intermeshing screw segments 14a. A single screw portion 14a may, of course, be utilized. Where twin screw segments 14a are used, one of the screw segments 14a within the barrel section 16d is diagrammatically shown to include a thread 52 defined by a base 54 and a crest 56. As the screw portion 14 and its included segment 14a rotate, the crest 56 sweeps out an envelope, depicted at 58. within or at the downstream terminus both the extraction location 50 and the segment 14a of the screw portion 14 shown in FIG. 4, the handedness of the screw portion 14 changes. If the segment 14a of the screw portion 14 within the extraction location 50 is right-handed, a short segment 14b thereof within or downstream of the extraction location 50 is left-handed. As shown by the pressure profile in FIG. 3, the pressures $P_u$ in the vicinity of and upstream of the extraction location 50 are due to forces on the material 24 which tend to move rightwardly and compact the material 24. The pressures within or $P_d$ downstream of the extraction location 50 are due to forces on the material 24 within or downstream of the extraction location 50 which tend to move leftwardly and compact the material 24. The coaction of the increasing pressure $P_u$ and of the opposing forces and the resultant pressures $P_u$ and $P_o$ squeeze and compact the material 24 within the barrel section 16e forcing the contained water therefrom. Having extracted water from the material 24, facilitites are provided to permit the water to exit the barrel-screw 12.

Instead of the screw portion 14 changing handedness within or downstream of the extraction location 50, other flow restricting techniques may be utilized to extract water from the material 24. For example, the Segment 14b may have a smaller, less severe pitch than the Segment 14a or may have no pitch. Other restrictive techniques which result in water being squeezed from the material 24 may also be used.

At, within or slightly upstream of the extraction location 50, an opening 60 is formed in the wall of the barrel section 16d. This opening 60 communicates with and is a continuation of the bore of a second barrel-screw which may be a feeder 62. The barrel 64 of the second barrel-screw 62 is mounted to the barrel section 16d, and the screw or screws 66 of the barrel-screw 62 access the bore of the barrel section 16d. The barrel-screw 12 and 62 are so related that the terminus 68 of the screw 66 is closely spaced from the envelope 58 swept out by the crest 56 of the thread 52 on the screw segment 14a. Preferably this spacing 70 is about two to three millimeters and may be as small as one millimeter.

The barrel-screw 62 may take any convenient configuration. In a specific embodiment of this invention, the barrel-screw 62 may be a co-rotating, intermeshing twin-screw feeder or machine, manufactured and sold by the assignee of the present invention under the designation ZSB. The screw(s) 66 of the barrel-screw 62 are configured so as to move material downwardly as viewed in FIGS. 4 and 4a or out of the plane of the drawing as viewed in FIGS. 1-3.

The barrel-screw 62 applies, or attempts to apply, drag force to substances in much the same manner as the extruder 12. Where the material 24 is a viscous substance like polystyrene, the barrel-screws 12 and 62 are able to quite efficiently transport and work or compact it. Where the substance is essentially non-viscous like water, the barrel-screws 12 and 62 are essentially unable to effect transport thereof.

Accordingly, the water included in the polystyrene reaches the extraction location 50 due to the efficient transport of the material 24 by the barrel-screw 12. At and throughout the extraction location 50, the water is squeezed from the material 24 by the rightward forces and their resulting pressures $P_u$ and by the opposing first and second forces acting along the extruder 12. The extracted water, now no longer incorporated in the material 24, is free to flow via the clearances of the barrel-screw 12, out of the opening 60 and into the barrel-screw 62. The water may thereafter be removed from the barrel-screw 62 via a drain, slots or the like which do not clog because the material 24 is not permitted to enter the barrel 64 by the action of its screws 66.

The material 24 being worked in the barrel section 16d as the water flows out of the opening 60 is itself prevented from passing through the opening 60 by the action of the barrel-screw 62 and the close spacing of the terminus 68 of the screw(s) 66 from the envelope 58. Any of the material 24 tending to flow through the opening 60 is maintained or forced back into the barrel section 16d by the action of the barrel-screw 62.

The short distances from the extraction location 50 and to exit opening 60 —which provides access to a water exit path comprised of the second barrel-screw 62 —permits efficient extraction and removal of water without substantial water flow countercurrent to the material flow to eliminate any deleterious effect on the quality of the material 24 or its processing. Also, water is not trapped in the apparatus between the extraction location 50 and the exit opening 60.

Preferably, the barrel-screw 62 is horizontally oriented, although other orientations are possible.

Thus, liquids such as water are removed from the material 24 by subjecting the material 24 to the effects of a "pinch point," that is, a location marking the confluence of three or more forces. The three forces present at the present pinch point, which may be at or slightly downstream of the extraction location 50, are produced by the rightward moving and compacting effects of the screw portion 14a (and of screw portions upstream thereof), the leftward moving and compacting effects of the opposite handed portion 14b and the transverse flow-preventing effects of the barrel-screw 62.

Once a desired degree of water is removed, the dewatered material 24 may be further worked and processed in the barrel portion 18 downstream of the extraction location 50 to produce pellets thereof or other stock capable of being processed into products made from the material 24. If desired, additional water extraction stages similar to that described above may be provided for serially extracting water from the material 24 until a desired degree of dryness is achieved. As shown in FIG. 3, the extraction location 50 may be distributed along the opening 60 from a location where the pressure $P_u$ is sufficiently high to extract water to the juncture of the screw portions 14a and 14b. In this way, most extracted water need only flow the short transverse distance from the barrel 16 to the opening 60, while some water, which is extracted at or near the end of the screw portion 14a, flows upstream a very short distance to the opening 60.

What is claimed is:

1. A method of removing a liquid from a mass of a material which is capable of being transported and worked by an extruder having a barrel-screw combination, wherein the method comprises:

transporting the liquid-containing material with a first barrel-screw to a liquid-extraction location within the first barrel, the first barrel-screw applying to the material first transporting and working forces which are generally applied in a first direction;

applying second transporting and working forces to the material within or slightly downstream of the liquid-extraction location, the second forces being applied in a second direction which is generally opposite the first direction, the application of the first forces and the simultaneous application of the first and second forces to the material tending to compact the material to extract therefrom the liquid contained therein;

permitting the extracted liquid to exit the first barrel from the liquid-extraction location along a path which extends away from the liquid-extraction location generally transverse to the first and second direction; and preventing the material from traversing the path by applying third transporting and working forces thereto along the path in a direction generally opposite to that taken by the exiting liquid, the application of the third forces being ineffective to prevent the exiting of the liquid, the first, second, and third forces effecting a pinch point on the material within or slightly downstream of the liquid-extraction location to substantially obviate liquid flow countercurrent to said first direction.

2. A method as in claim 1, wherein:
    the third forces comprise drag flow forces which are effective to prevent the material from traversing the path but which are ineffective to prevent the liquid from traversing the path as and after it exits the first barrel.

3. A method as in claim 2, wherein:
the third forces are produced by a second barrel-screw, the second barrel being in communication with the first barrel and the terminus of the second screw being closely spaced from and closely coupled to the envelope of the first screw.

4. A method as in claim 3, wherein:
the spacing between the terminus of the second screw and the envelope of the first screw is approximately 1 to 3 millimeters.

5. A method as in claim 1, wherein:
before the transporting step the material is cleaned and comminuted, the cleaning including washing or rinsing the material with the liquid.

6. A method as in claim 5, wherein:
the material is plastic and the liquid is primarily water.

7. A method as in claim 6, wherein:
the plastic is polystyrene.

8. A method as in claim 1, wherein:
the material is polystyrene and the liquid is water.

9. A method as in claim 8, wherein:
at least approximately 70% of the water present in the polystyrene is removed via the path.

10. A method as in claim 1, wherein:
the path of the liquid and the direction of the third forces are generally horizontal.

11. A method as in claim 1, wherein:
the first and second forces generally oppose each other at a defined location, the first forces being greater than the second forces, and
the third forces are applied substantially at the defined location to produce said pinch point.

12. A method as in claim 1, wherein:
the first and second forces generally oppose each other at a defined location, the first forces being greater than the second forces, and
the third forces are applied at or slightly upstream of the defined location to produce said pinch point.

13. A method as in claim 1, wherein:
the second forces are produced by a section of the first screw which section is opposite-handed relative to the portion of the screw upstream thereof, and
the third forces are produced by a second barrel-screw and tend to transport the material in a direction toward the first screw.

14. A method as in claim 1, wherein:
the material remains substantially unmelted at and upstream of the liquid-extraction location.

* * * * *